Fig. 1

Jan. 25, 1966  J. A. POTVIN  3,231,743
OPTICAL FIBER ACQUISITION AND TRACKING SYSTEM
Filed March 13, 1962  6 Sheets-Sheet 3

INVENTOR
JEAN ADRIEN POTVIN

BY Hurvitz & Rose
ATTORNEYS

3,231,743
OPTICAL FIBER ACQUISITION AND
TRACKING SYSTEM
Jean Adrien Potvin, Orlando, Fla., assignor to Radiation, Incorporated, Melbourne, Fla., a corporation of Florida
Filed Mar. 13, 1962, Ser. No. 179,293
19 Claims. (Cl. 250—203)

This invention relates to a high sensitivity, optical system for use in acquisition and tracking systems and more particularly to a high sensitivity optical system wherein an image is reduced to discrete portions which are sensed by an array of discrete optical sensing elements for determining the displacement of the image from the optical axis of the system.

In the past it has been the practice in optical systems for acquisition and tracking of objects to sense the entire image produced and to sense the displacement of the entire image from a point of reference in order to generate error signals for tracking control. In order to provide high signal-to-noise ratios, in prior systems the image is focused at a point, the image therefore being very small, and exceedingly delicate sensing apparatus the resolution and accuracy of which is limited by the small image size must be utilized to provide accurate tracking control signals. Moreover, aberrations in conventional optical systems using optical elements which produce a point image, for example, a parabolic lens or reflector, are subject to distortion caused by coma, astigmatism, and curvature of field, thereby further reducing accuracy. If the aperture is restricted in prior systems in order to improve signal-to-noise ratios, the ratio of aperture diameter to focal length is decreased, thereby producing an image of reduced intensity which imposes a greater need for even more sensitive and delicate image-sensing and detection apparatus.

According to the present invention there is provided in an optical system an array of discrete optical sensing elements, each element being preferably in the form of a cylindrical optical fiber. One flat end of each of the cylindrical optical fibers for receiving an image portion is located in the focal plane of an image formed thereon by an optical element such as a lens or reflector. In the array of optical fibers, only those optical fiber ends adjacent each other in the center region of which the optical axis is in the center are to be utilized for tracking purposes, the remaining optical fiber ends being utilized for purposes of acquisition. The other, light transmitting ends of the cylindrical optical fibers are polished flat and are arranged in the form of a bundle, which may be circular in cross section, and with the fibers used for tracking purposes located in the center region thereof and surrounded by the fibers used for acquisition purposes. Photo detection means are placed adjacent the circular transmitting end of the fiber optics bundle, and a variable iris diaphragm positioned between the photo-detection means and the light transmitting ends of the optical fibers. The photo detection means senses the displacement of an image from the optical axis of the optical element, and means responsive to the detected image displacement may be provided for deriving the error control signal therefrom to permit the moving of the optical system until the image appears on portions of all of the tracking fibers only. The difference in light energy between the portions of the image appearing on the respective tracking fibers is sensed, and the optical system is positioned until the image appears in equal portions on the respective tracking fibers.

An important feature of the present invention is the provision of an adjustable iris diaphragm located between the photo detection means and the light transmitting ends of the discrete optical fiber elements, whereby the effective field of view of the optical system may be restricted to obtain greater signal-to-noise ratios without reducing the aperture of the image receiving ends of the optical fiber array.

According to the invention in one of its forms, there is provided an optical acquisition and tracking system including a cylindrical optical element which may have a parabolic reflecting surface, for focusing the incident light into a line image. In the focal plane of the cylindrical optical element is an array of discrete image receiving optical fiber ends. The discrete optical fiber ends of the array are arranged in the form of a plurality of adjacent parallel rows parallel to the line of the image, there being interstices between each discrete optical fiber and the adjacent discrete optical fibers. The two innermost parallel rows of discrete optical fiber ends are utilized for tracking purposes, and the remaining discrete optical fiber ends are utilized for acquisition purposes. When the optical system is moved so that portions of the image line appear on portions of both parallel rows of tracking fibers, an electrical energy difference derived through photosensitive means representing the difference in the amount of the image line appearing on each parallel row of tracking fibers provides an error control signal. When the difference in electrical energy representing the portions of the line image appearing on each of the rows of tracking fibers becomes zero, the line image appears in equal portions on each of the parallel tracking rows, and if the optical system is properly adjusted, the center of the image line is bisected by the optical axis of the system. In order to controllably restrict the angular field of view as the image moves from the acquisition group of fibers to the tracking group of fibers in situations where an even greater signal-to-noise ratio is desired, an adjustable screening arrangement may be provided in the path of the incident light to the image receiving ends of the discrete optical fibers.

It is, accordingly, a broad object of the invention to increase the signal to noise ratio and resolving power in optical sensing systems, thereby increasing the sensitivity in optical tracking and acquisition systems.

Another object of the invention is to increase the sensitivity of optical acquisition and tracking systems by dividing an image into discrete portions of measurable energy difference.

Another object of this invention is to provide an improved optical acquisition and tracking system wherein an image is divided into discrete portions by means of an array of separate groups of discrete optical sensing elements arranged to provide an indication of the displacement of the image from the optical center of the system.

Another object of the invention is to provide an optical acquisition and tracking system wherein an image divided into discrete portions by an array of separate groups of discrete optical fiber ends is translated into electrical signals representing the displacement of the image from the optical axis of the system, the electrical signals being utilized to controllably position the optical system until the center of the image appears on the optical axis of the system.

Another object of the invention is to provide, in an optical acquisition and tracking system wherein an image is divided into discrete portions by an array of discrete optical sensing elements arranged in groups, means for increasing the effective signal-to-noise ratio without restricting the angular aperture of the optical system.

Yet another object of the invention is to provide a very sensitive optical acquisition and tracking system wherein a line image is produced to appear on the focal plane of the system, there being located in the focal plane of the system an array of discrete optical sensing elements for dividing the line image into discrete portions from which a highly accurate indication of the displacement of the line image from the optical axis of the system may be derived.

Another object of this invention is to provide a very sensitive optical acquisition and tracking system having a cylindrical optical element preferably having a modified parabolic surface for correction of spherical aberration for producing a line image, there being an array of discrete optical fibers arranged in separate groups of discrete image receiving optical fiber ends located in the focal plane of the optical system, the other, light transmitting ends of the optical fibers being formed into a bundle wherein the separate groups of optical fibers are disposed in a predetermined pattern, the amount of light transmitted by the optical fibers in the pattern being controllable to increase the signal-to-noise ratio of the optical system without decreasing the actual aperture thereof.

These and other objects and features of the invention will be better understood by referring to the drawings in which:

FIGURE 1-A is a modified cross sectional view of the apparatus of FIGURE 1;

FIGURES 1-B to 1-D are views schematically illustrating the manner by which the screens of FIGURES 1 and 1-A function;

Figure 1:
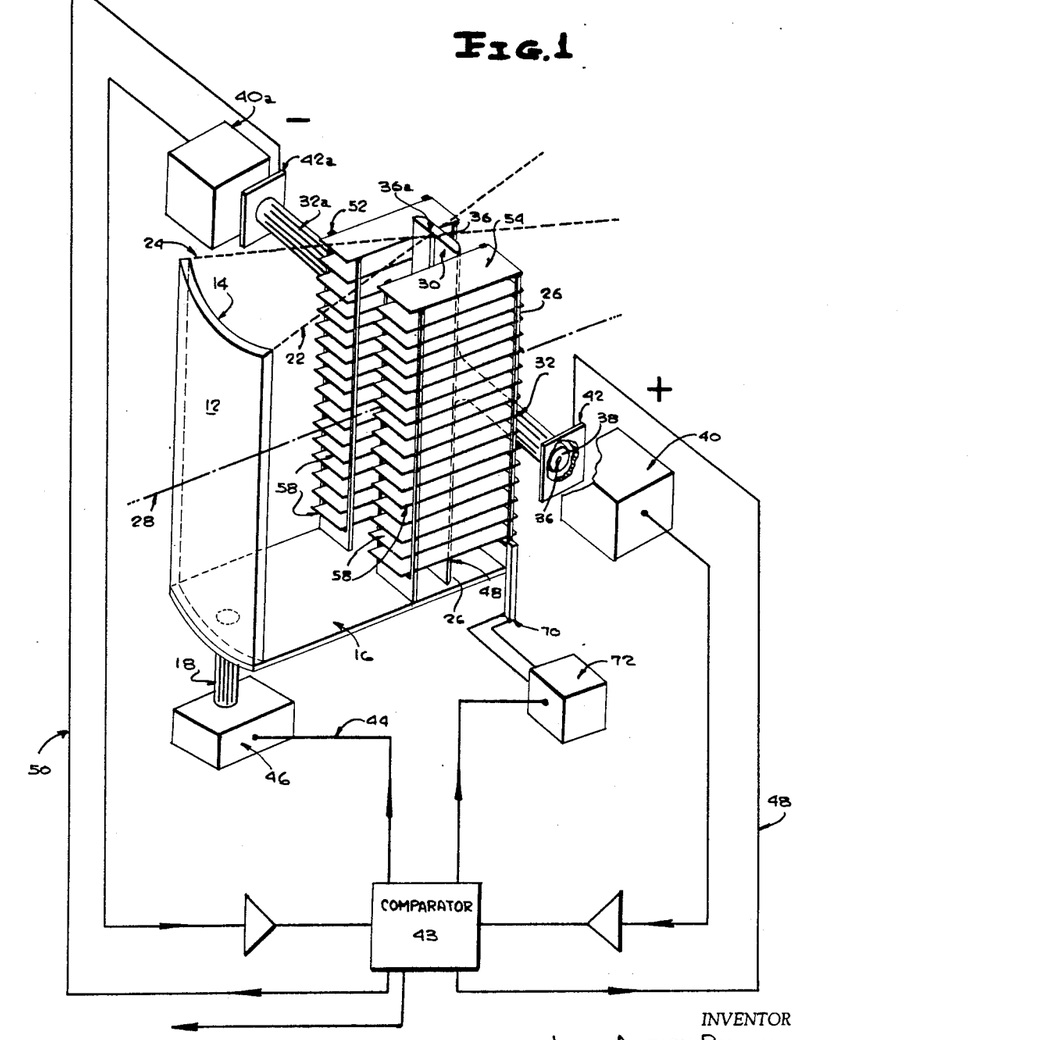
FIGURE 1 is an illustrative view in perspective of an embodiment of the invention and including an explanatory diagram of a control circuit associated therewith.
Figure 2:
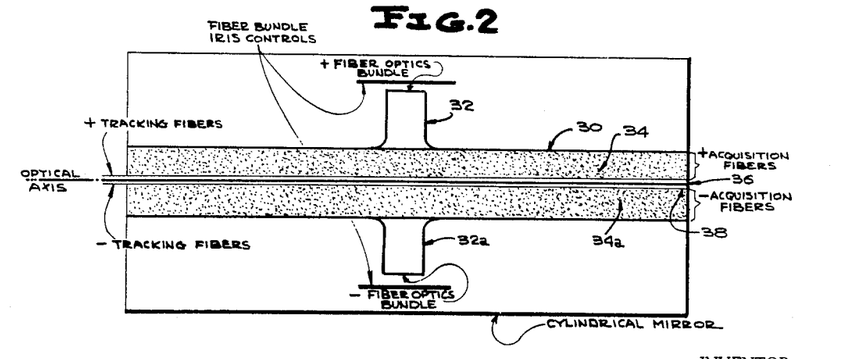
FIGURE 2 is an explanatory diagram of an array of discrete optical fiber ends for sensing a line image according to the invention.

Referring to FIGURES 1 and 1-A, and 2, a form of the optical acquisition and tracking system of the invention illustrated therein includes a cylindrical optical element 12 shown as a reflector but which may be a lens to provide an image in the form of a line. The reflecting surface 14 of the optical element 12 is preferably ground and polished to modify the spherical aberration.

Figure 11:
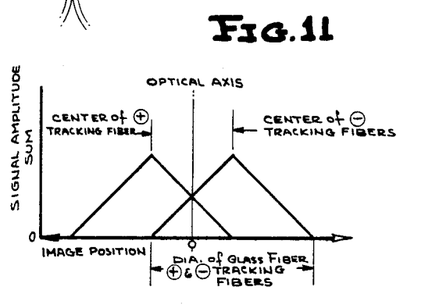
FIGURES 11, 12, 13 and 14 are graphs for explaining the operating principles of the invention.
Figure 12:
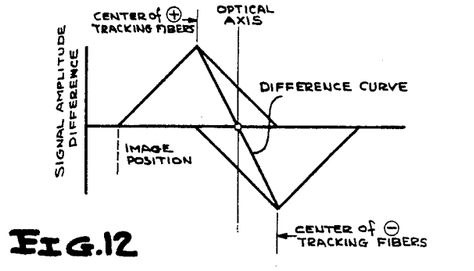
Figure 13:
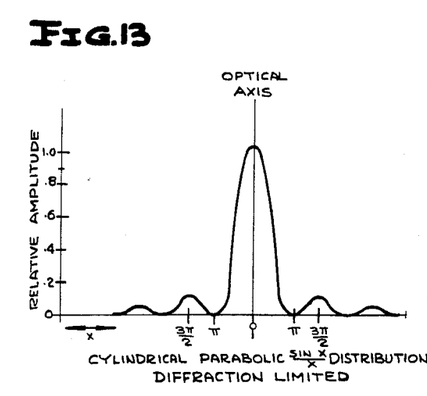

As shown in the graphs of FIGURES 11 and 12 which represent image distribution versus amplitude plots of cylindrical paraboloid (no spherical aberrations) and cylindrical reflectors or lenses (with modified spherical aberration) respectively, the choice of the form of a reflecting surface (or lens) 14 depends upon the type of image amplitude/distribution characteristic curve desired. It has been found that aspherical cylindrical lenses or reflectors having modified spherical aberration to produce the amplitude/distribution curve of FIGURE 12 offer particular advantages in accordance with the invention, as will be pointed out hereinbelow. The cylindrical optical element 12 is mounted on a plate 16 which provides a support therefor. The plate 16 is mounted on a shaft 18, the axis of the shaft 18 intersecting the plate 16 at a point spaced a small distance in front of the reflecting element 12.

The focal plane 20 of the cylindrical reflector 12 is indicated as being in the plane of the intersection of the two lines 22 and 24. Mounted on the plate 16 in the focal plane 20 is an opaque support 26. The opaque support 26 is of a height equal to that of the cylindrical reflector 12 and is perpendicular to the optical axis of the system, indicated at 28.

An array 30 of discrete optical fibers is mounted on the support 26 by suitable means. Each of the discrete optical fibers is tubular or cylindrical in form, the outer or sheath portion of each fiber being of a material having a lower index of refraction than the transparent material of the inner portion. The image receiving ends of the optical fibers mounted in the support 26 are ground and polished flat and face toward the cylindrical reflecting surface 14 at right angles thereto.

Figure 6:
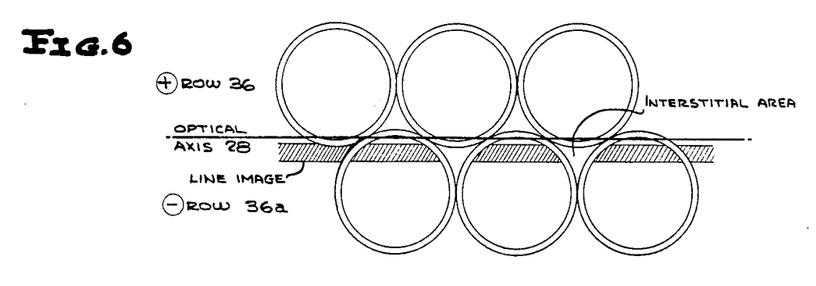

Each of the cylindrical optical fiber ends in the array 30 is tangent to each of the surrounding optical fiber ends. As best seen in FIGURE 6, the resulting geometrical relationship of the optical fiber ends in the array 30 defines interstices between the optical fiber ends as indicated.

As best seen in FIGURE 2, the vertical support 26 is divided in half by the optical axis 28. One group of optical fibers forming a bundle 32, hereinafter referred to as the positive fiber group 34, is mounted in one half of the support 26, so that the ends thereof form one-half of the array 30, and another group of optical fibers forming a bundle 32a, hereinafter referred to as the negative fiber group 34a, is mounted in the other half of the support 26 to form the other half of the array 30.

The two innermost vertical rows of fiber ends of the optical fiber array 30 are intersected in equal segments by the vertical plane of the optical axis 28. The two innermost rows are designated as a positive tracking row 36 and as a negative tracking row 36a respectively, the positive row 36 being included in the bundle 32 with the positive fiber group 34 and the negative tracking row 36a being included in the bundle 32a with the negative fiber group 34a. The remaining optical fibers in the bundles 32 are designated as the positive acquisition fibers 38, and the remaining optical fibers in the bundle 32a are designated as the negative acquisition fibers 38a.

It is clear that a vertical line image formed by the cylindrical reflecting surface 14 will appear as a line having portions thereof appearing on the optical fiber ends of the array 30 in the focal plane 20. If the vertical line image is adjusted to be of a width approximately equal to or less than the diameter of an optical fiber, then the vertical line image of an object intersected by the optical axis 28 will appear as equal portions of a line on each of the positive and negative vertical tracking fiber rows 36 and 36a respectively.

Referring to FIGURES 3-8, and 11-14, various exemplary relationships between the line image width and the fiber diameter are illustratively shown therein. The sensitivity of the system according to the invention may be changed by varying the relationship between fiber diameter and image width. The ratio of image width to fiber diameter determines the function of energy difference and the total energy transmission of the system. That is, the energy transmission difference is affected by losses due to the amount of the image lost in the interstitial spaces between the discrete optical fibers.

Figure 3:
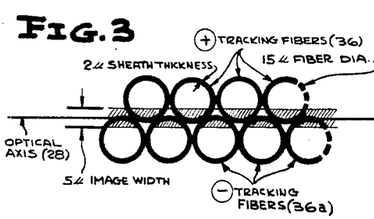
FIGURES 3-8 are enlarged views of the array of discrete optical fiber ends of the tracking group according to the invention.
Figure 4:
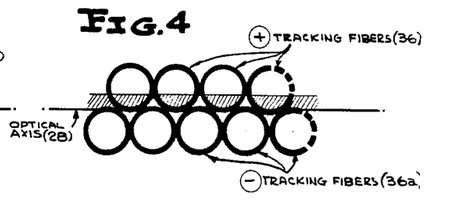

As shown in FIGURE 3, a line image of a width of 5 microns is centered on the optical axis 28, equal portions of the line image passing through optical fibers each of 15 microns in diameter and having a sheath of 2 microns thickness. In a laboratory test under these conditions the optical fibers were observed to pass about 18.6% of the toatal light available in the image. When, as shown in FIGURE 4, the image was shifted 2 microns off the optical axis 28, say toward the positive tracking row 36, the total transmission was observed to be raised to about 23.2% of the total energy, and no light was transmitted in the negative tracking row 36a.

Figure 5:
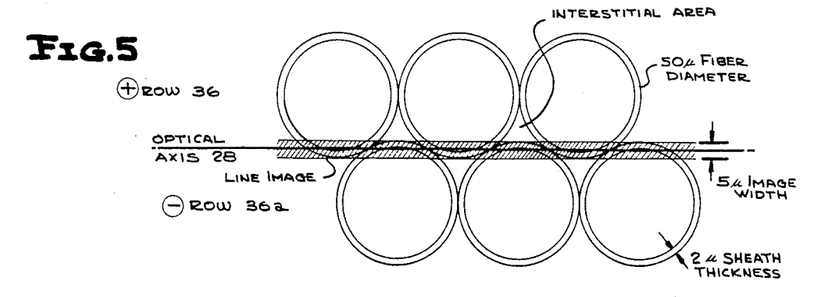

In FIGURE 5, the line image is 5 microns in width, and the fiber diameter is 50 microns, each fiber having a lower refractive index sheath of 2 microns in thickness. In a laboratory test under these conditions the total transmission of the optically centered line image was about 59% of the total available energy. As shown in FIGURE 6, when the line image is shifted by 5 microns from the optical axis 28, say in the direction of the negative tracking row 36a, the total transmission through the negative tracking row 36a is about 62.5% of the total, no light being transmitted through the positive tracking row 36.

Figure 7:
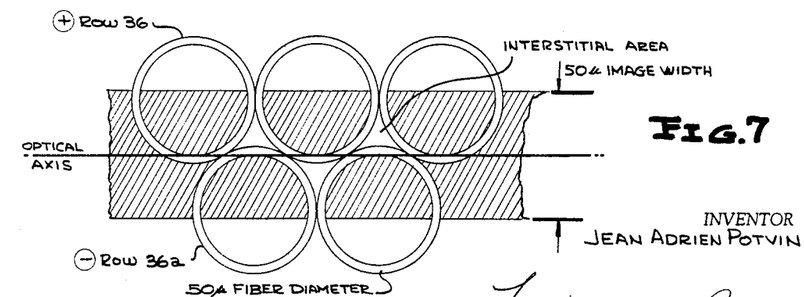
Figure 8:
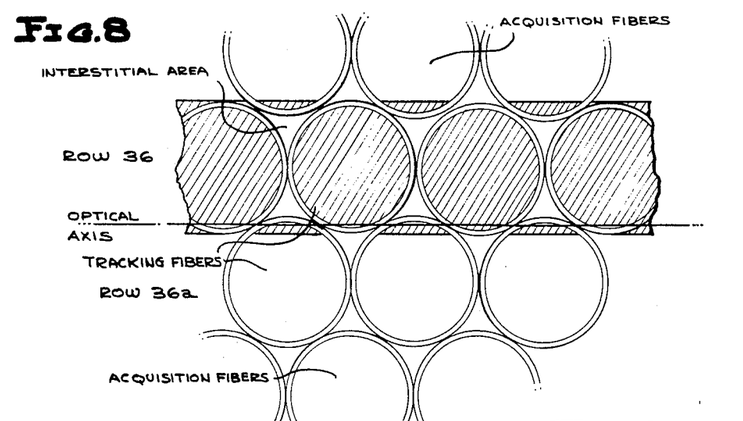

FIGURE 7 shows the image width as being equal to the fiber diameter, 50 microns. With the line image bisected by the optical axis, the total transmission was observed to be about 80%. As shown in FIGURE 8, a shift of 21.5 microns of the line image from the optical axis 28, shown offset over the positive tracking row 36, results in about 80% transmission through the positive tracking fiber row 36 and approximately 5% transmission through the negative tracking row 36a.

Figure 14:
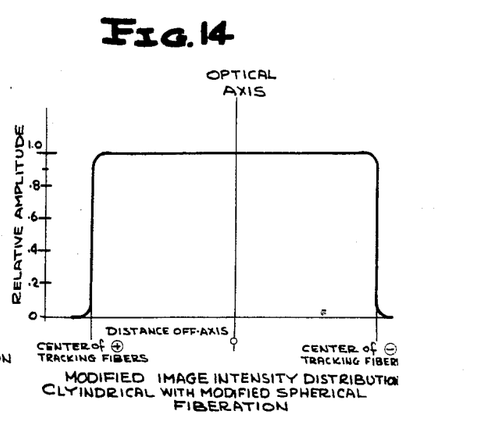

A graph of the light energy distribution of the arrangement shown in FIGURE 7 is shown in FIGURE 11. The graph is a plot of the image position versus the sum of the signal amplitudes of the light transmitted through the positive and negative tracking fiber rows 36 and 36a respectively when the line image is centered on the optical axis 28, and where the image width is equal to the fiber diameter as illustrated in FIGURE 7. The amplitude/distribution characteristic curve of FIGURE 14 produced by a cylindrical lens having modified spherical aberration is used to produce the image, the advantage thereof being constant amplitude in the tracking fiber region. Under these conditions, the light energy may be divided equally between the positive and negative tracking fiber rows 36 and 36a, and the difference in the light energy therebetween is zero. As shown in the graph of FIGURE 12, which represents a plot of the image position versus the signal amplitude difference in the transmitted light of the image through the positive and negative tracking fiber rows 36 and 36a respectively, when the center of the image is on the center of one of the tracking fiber rows, say, the positive tracking row 36, there is a maximum difference between the transmitted light therethrough and through the negative tracking fiber row 36a, as indicated by the slope of the "difference curve" indicated therein. It is observed that the maximum energy difference does not, under these conditions (fiber diameter equal to image width) occur when the image is completely removed from one of the tracking rows 36, 36a, but occurs according to the ratio of tracking fiber diameter to image width. The sensitivity of the tracking arrangement decreases as the image width increases, assuming a constant focal length and fiber diameter, and an image of amplitude/distribution characteristics as shown in FIGURE 14 results.

According to the invention, for tracking purposes the difference in transmitted energy between the tracking fiber rows 36 and 36a is preferably utilized from which correction signals may be derived to control the movement of the optical system.

Figure 9:
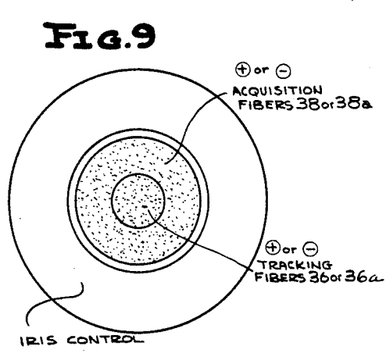
FIGURES 9 and 10 are explanatory diagrams of the invention.

As shown in FIGURES 1 and 9, the positive fiber bundle 32 and the negative fiber bundle 32a may be circular in cross section, although other cross sections of varying shapes may be utilized depending upon special characteristics desired.

Each of the bundles 32 and 32a may be positioned to extend laterally away from the support 26. The ends of the bundles 32 and 32a are cut perpendicular to the axes of the optical fibers and are ground and polished flat. The ends of the optical fibers in each of the bundles 32 and 32a serve to transmit the incident light energy received at the other fiber ends located in the array 30 in the focal plane 20.

The configuration of the light transmitting ends of the optical fibers in the bundles 32 and 32a is shown in FIGURE 9. The light transmitting ends of the tracking fibers of either of the tracking fiber rows 36 or 36a are preferably positioned in the center region of the optical fiber bundles 32 or 32a respectively, and the acquisition fibers 38 or 38a are positioned in the surrounding circular area.

A photomultiplier 40 is located in spaced relationship from the light transmitting ends of the optical fibers of the positive fiber group 34 in the bundle 32, and a photomultiplier 40a is located in spaced relationship from the light transmitting ends of the optical fibers in the negative fiber group 34a in the bundle 32a.

An iris diaphragm 42 of conventional design is located between the photomultiplier 40 and the transmitting ends of the optical fibers in the bundle 32, and a similar iris diaphragm 42a is similarly located between the photomultiplier 40a and the bundle 32a.

Figure 10:
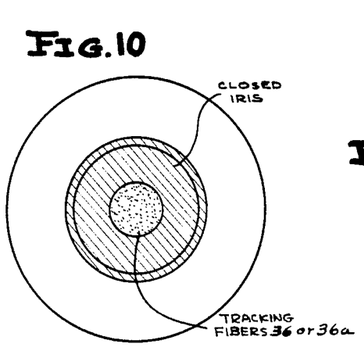

The iris diaphragms carry out the important function, according to the invention, of limiting the amount of light energy transmitted from the optical fiber ends in the bundles 32, 32a after an image has been positioned on either or both of the tracking fiber rows 36, 36a. The limiting of the amount of light increases the effective signal-to-noise ratio, that is, the ratio of image-forming incident light to non-image-forming incident light, of the optical system as seen from the photomultipliers 40 and 40a respectively. Referring to FIGURE 10, as the image is drawn closer to either or both of the tracking fiber rows 36, 36a, the iris diaphragm may be proportionally closed down to exclude light transmitted from the outer fibers on which the image does not appear, thereby excluding non-image-forming incident light.

When the image appears entirely on either or both of the tracking fiber rows 36, 36a of the array 30, only the tracking fibers in the center regions of either of the bundles 32, 32a are transmitting light representing the image, and the iris diaphragms may be closed down to exclude all of the acquision fibers in the acquisition groups 38 and 38a respectively.

The electrical energy produced by the photomultiplier 40 may represent the total energy of light incident upon the positive group 34 of optical fiber ends in the array 30, and in a similar manner the photomultiplier 42a may produce electrical energy representing light incident on the negative group 34a of optical fiber ends in the array 30.

The output from the photomultiplier 40 is fed to one input of a comparator 43 of conventional design, and the output of photomultiplier 40a is fed to a second input of the comparator 43. The comparator 43 compares, for example, subtracts, the electrical energy from one of the photomultipliers 40, 40a from the other of the said photomultipliers. The resulting compared signal represents the difference in the incident light energy between the positive group 34 and the negative group 34a of the optical fiber array 30.

An output lead 44 from the comparator 43 may be connected to the field coils of a servo motor 46, suitably linked to the shaft 18 of the optical system of the invention in order to position the plate 16 in a manner to bring the optical axis 28 closer to the object to be tracked in response to signals from the comparator 43.

A pair of output leads 48 and 50 may be provided to feed the comparator output to the iris diaphragms 42 and 42a respectively, the iris diaphragms having suitable conventional servo motors mounted therein (not shown) to close the iris diaphragms in response to the comparator output.

A pair of incident light limiting screens may be mounted on opposite sides of the support 26. The bottoms of the screens are fixed to plate 16 and allowed to pivot while the upper part of the screens are movable parallel to surface 14. The purpose of the screens 52 and 54 is to limit the angle of the light incident upon the reflecting surface 14 and the fiber optics array 30, thereby further increasing the signal-to-noise ratio of the system.

The screens 52 and 54 are of identical construction and mounted to a common movable frame 56. Screens 52 and 54 have a plurality of parallel slats 58 suitably mounted and spaced at equal intervals.

Figure 1C:
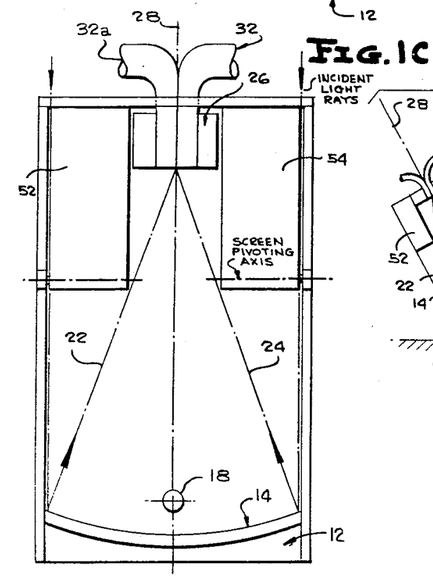

As best seen in FIGURE 1–C (end view), the two screens 52 and 54 are separated by a sufficient distance at the pivoting axis to prevent intercepting the outermost reflected rays 22 and 24. The side view of FIGURE 1A shows the limiting effect of the slats 58 in screens 52 and 54 as shown by light rays 62 and 64. The included angle between 62 and 64 can be varied by changing the length and spacing of slats 58.

The outer frame 56 may be movable parallel to surface 14 thereby changing the angle of the slats 58 relative to the reflecting surface. Screen frame 56 may be movable by means of a conventional linkage indicated at 70 driven by a servo motor indicated at 72. The servo motor 72 may be controlled by the output from a second optical system mounted on the same common base.

Other suitable well known means may be used for processing electrical energy derived from the light energy relationships of the image with a particular array. Moreover, one single axis (line image) system may be used to control the field of view of another line image system used in conjunction therewith and disposed to have a field of view at right angles to the one system. The resulting system is two fan shaped fields of view intersecting at right angles.

Each optical system consists of two identical optical units mounted with their pivot axes 18 perpendicular to each other on a common base.

As can be seen in FIGURE 1–D (side view), the tilt direction of screens 52 and 54, on the axis "B" optical unit is controlled by the direction of the optical axis 28 of the axis "A" optical unit. Conversely the tilt direction of screens 52 and 54, on the axis "A" optical unit is controlled by the direction of the optical axis 28 of the axis "B" optical unit.

Referring to FIGURES 15, 16, 17 and 18 the diagrams therein illustrate how the principles and apparatus according to the present invention may be incorporated into conventional optical systems to effect an improvement therein.

Figure 15:
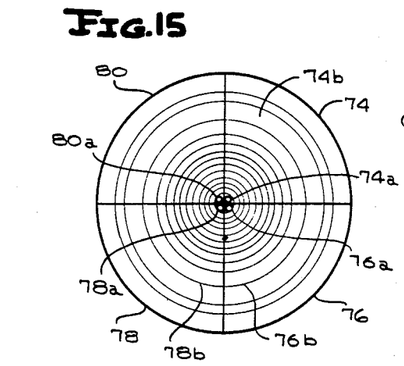
FIGURES 15-18 are explanatory diagrams of another embodiment of the invention.

FIGURE 15 shows a diagram of the focal plane of a parabolic lens or reflector. In the focal plane is an image receiving circular array of discrete optical fiber elements according to the invention. The array is divided into four sectors 74, 76, 78 and 80 at the apex of each of which is one tracking fiber, each tracking fiber being designated at 74a, 76a, 78a and 80a respectively. The remaining discrete optical fibers in the sectors are for acquisition purposes and are designated as acquisition groups 74b, 76b, 78b and 80b.

Figure 16:
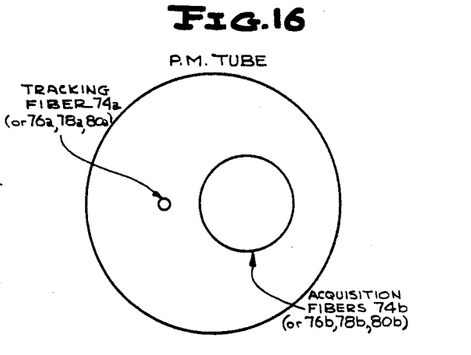

The tracking fiber and the acquisition fibers of each of the sectors 74–80 are monitored by a photomultiplier tube for each sector, the tracking fiber of each sector being separated from the acquisition fibers associated therewith as shown in FIGURE 16. The acquisition fibers may be arranged in successive concentric circles, and each of the tracking fibers 74a, 76a, 78a and 80a is in the form of a sector in cross section. A diaphragm may be located between the light transmitting ends of the fiber optics array and each of the photomultipliers therefor, in order to increase the signal-to-noise ratio of the system. With the light transmitting ends of the fibers of the array arranged as shown in FIGURE 16, a shutter of the guillotine type may be used, all of the fibers of the acquisition groups respectively being cut off from the photomultiplier tube associated therewith when the image is caused to appear exclusively on the tracking fibers 74a, 76a, 78a and 80a. Alternatively, an iris diaphragm may be used as previously described in accordance with the invention if each of the tracking fibers is located at the center of a circle and surrounded by the acquisition fibers as shown in FIGURES 9 and 10.

Figures 17, 19:
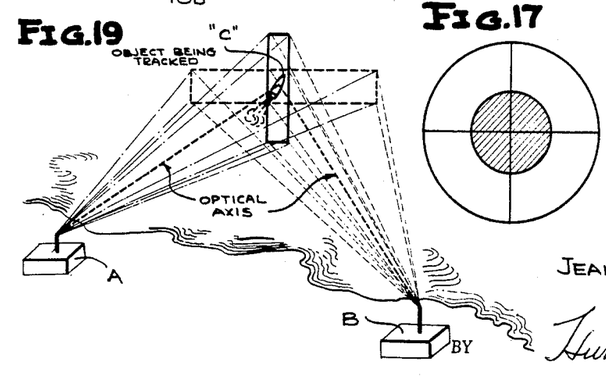
FIGURE 19 is an illustration of the invention utilized at two tracking stations.

FIGURE 17 shows an enlarged view of the four tracking fibers 74a, 76a, 78a and 80a, each having a cross section in the form of a sector, located in the center of the array. The circular shaded area represents an image centered on the optical axis of the system. When the image is centered on the optical axis of the system, the light energy appearing on each of the tracking fibers is equal to that appearing on each of the other tracking fibers.

Figure 18:
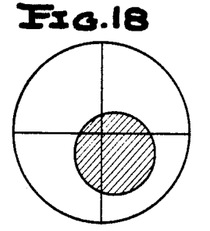

In FIGURE 18 the image is shown displaced or off-axis. The difference in light energy appearing on opposing sectors of the array may then be compared in the same manner as previously described in conjunction with the comparison of the light energy of a line image on the tracking fibers 36 and 36a of FIGURES 2–8, except that an additional comparison may be made in the instant situation for the additional opposing tracking fibers. Other arrangements for comparing the light energy appearing on the optical fibers may be used.

Alternatively, a line image system according to the invention may control the field of view of a conventional parabolic lens or reflector, and consequently the field of view of the system according to the invention as indicated in FIGURES 15–18 may be controlled by another tracking system according to the invention to provide accurate triangulation.

The system of the present invention has many uses in systems such as, for example, theodolites, auto theodolites, auto-collimating theodolites, and with pulsed light ranging devices, the accuracy of all of which is considerably increased when incorporated with the system of the invention. For example, it has been found that the system of the invention is accurate in measuring angles to less than one second of arc from the optical axis of the system.

Two optical systems consisting of two mutually perpendicular optical units at each site A and B can be used for accurate triangulation of an object at C in space.

The system is designed to operate at maximum efficiency on objects with maximum contrast such as stars or lights on a missile in a night sky.

I claim:

1. An optical acquisition and tracking system comprising a movable platform, a servo motor for driving said platform, an optical element mounted on said platform for focusing an image of the object to be tracked, a plurality of discrete optical fibers arranged in a plurality of bundled groups thereof, the discrete optical fibers of all of said bundles constituting at one end thereof an array of image receiving discrete optical fiber ends located substantially in the focal plane of the image, the discrete optical fiber ends of each of said groups occupying distinct regions of said array symmetrically in relation to the optical axis of the system, at least one discrete optical fiber of each of said groups thereof being located to have a portion of the end thereof in said array at least tangent to the optical axis of the system, the discrete optical fibers of all of said bundled groups thereof constituting at the other end of each group thereof a pattern of light-transmitting optical fiber ends, said at least one discrete optical fiber of each of said groups thereof being located in a distinct region of said pattern, means associated with each of said other ends of said bundled groups of optical fibers for translating light energy to electrical energy, said energy varying in amplitude in response to the amount of light incident upon said translating means, variable means for restricting the light transmitted from each of said other ends of said bundled groups to vary the ratio of incident image light to non-image incident light reaching said translating means, and comparison means responsive to the relative amplitudes of said electrical energies for supplying a control signal to said servo motor.

2. Apparatus according to claim 1 wherein each of said discrete optical fibers is comprised of a transparent cylindrical portion having a sheath of lower index of refraction than that of said portion.

3. Apparatus according to claim 1 including first and second relatively movable screen means mounted on opposite sides respectively of said optical element and in the path of light incident to said array for limiting the angle of incident light.

4. Apparatus according to claim 3 including a further servomotor adapted to drive said screen means in response to the output of said comparison means.

5. Apparatus according to claim 1 including means responsive to the output of said comparison means for controlling said variable means.

6. Apparatus according to claim 1 wherein said optical element has a substantially cylindrical optical translating surface for producing an image in the form of a line of a width at least approximately equal to or less than a dimension of each of said discrete optical fiber ends parallel to the width dimension of said line.

7. Apparatus according to claim 6 wherein each of said discrete optical fiber ends in said array is circular and in tangent relationship to each adjacent discrete optical fiber end there surrounding.

8. Apparatus according to claim 1 wherein each of said bundled groups of discrete optical fibers is circular in cross section, said at least one discrete optical fiber being located at the center region of each said pattern of light transmitting optical fibers in each group, and wherein said variable means is an iris diaphragm.

9. Apparatus according to claim 1 wherein the optical translating surface of said optical element is substantially a paraboloid and each of said groups of discrete optical fiber ends in said array occupies a quadrant of a circular area.

10. A plurality of optical acquisition and tracking systems each in a different geographical location and each comprising a movable platform, a servo motor for driving said platform, optical means mounted on said platform for focusing an image of the object to be tracked, a plurality of discrete optical fibers arranged in a plurality of bundled groups thereof, the discrete optical fibers of all of said bundles constituting at one end thereof an array of image receiving discrete optical fiber ends located substantially in the focal plane of the image, the discrete optical fiber ends of each of said groups occupying distinct regions of said array symmetrically in relation to the optical axis of the system, at least one discrete optical fiber of each of said groups thereof being located to have a portion of the end thereof in said array at least tangent to the optical axis of the system, the discrete optical fibers of all said bundled groups thereof constituting at the other end of each group thereof a pattern of light-transmitting optical fiber ends, said at least one discrete optical fiber of each of said groups thereof being located in a distinct region of said pattern, means associated with each of said other ends of said bundled groups of optical fibers for translating light energy to electrical energy, variable means for restricting the light-transmitted from each of said other ends of said bundled groups to vary the ratio of incident image light to non-image incident light reaching said translating means, comparison means responsive to the relative amplitudes of said electrical energies for supplying a control signal to said servo motor, one of said optical systems having incident light angle limiting means controllable by said comparison means of another of said optical systems.

11. Apparatus according to claim 10 wherein the light translating surface of said optical element is substantially cylindrical to produce an image in the form of a line, and said one of said optical systems being oriented at right angles to another of said optical systems.

12. A system for tracking an optical image comprising means for transmitting the optical image to a pair of remote locations, means for focusing the image on the input of said transmitting means, said transmitting means including: a multiplicity of rod like elements transmitting light from their first ends to their other ends, said first ends being positioned adjacent to each other in the focal plane of said image, said first ends being divided into two separate adjacent segments having a common boundary, the second ends of the elements of said segments being arranged in separate, first and second circular arrays, respectively, the elements in each array together forming an image common thereto, the first ends in the first of said segments at the boundary being positioned at the center of said first array, the first ends of the second segment at the boundary being positioned at the center of said second array, means for translating the light energy deriving from each of said arrays into separate signals, the magnitude of each signal being related to the light intensity deriving from the array associated with it, means responsive to the relative magnitudes of said signals for adjusting the position of said first ends so they are tended to be adjusted whereby equal energy levels derive from said arrays, a variable iris between each of said arrays and each of said translating means, each of said irises being coincident with the center of its associated array, the minimum opening of each iris being commensurate with the center area of the second ends of the predetermined elements associated with it, and means responsive to the relative magnitudes of said signals for adjusting the openings of said irises, said openings being minimum when equal energy levels derive from said arrays.

13. A system for tracking an optical image comprising means for transmitting the optical image to a pair of remote locations, means for focusing the image on the input of said transmitting means, said transmitting means including: a multiplicity of rod like elements transmitting light from their first ends to their other ends, said first ends being positioned adjacent to each other in the focal plane of said image, said first ends being divided into two separate adjacent segments having a common boundary, the second ends of the elements of said segments being arranged in separate, first and second circular arrays, respectively, the elements in each array together forming an image common thereto, the first ends in the first of said segments at the boundary being positioned at the center of said first array, the first ends of the second segment at the boundary being positioned at the center of said second array, and means for translating the light energy deriving from each of said arrays into separate signals, the magnitude of each signal being related to the light intensity deriving from the array associated with it, means responsive to the relative magnitudes of said signals for adjusting the position of said first ends so they are tended to be adjusted whereby equal energy levels derive from said arrays, and means for varying the angle of light incident upon said first ends from said means for focusing.

14. The system of claim 13 including means responsive to the relative magnitudes of said signals for adjusting said angle, said angle being minimum when equal energy levels derive from said arrays.

15. A system for tracking an optical image comprising means for transmitting the optical image to a pair of remote locations, means for focusing the image on the input of said transmitting means, said transmitting means including a multiplicity of rod like elements transmitting light from their first ends to their other ends, said first ends being positioned adjacent to each other in the focal plane of said image, said first ends being divided into two separate adjacent segments having a common boundary, the second ends of the elements of said segments being arranged in separate, first and second circular arrays, respectively, the elements in each array together forming an image common thereto, the first ends in the first of said segments at the boundary being positioned at the center of said first array, the first ends of the second segment at the boundary being positioned at the center of said second array, and means for translating the light energy deriving from each of said arrays into separate signals, the magnitude of each signal being related to the light intensity deriving from the array associated with it, a variable iris between each of said arrays and each of said translating means, each of said irises being coincident with the center of its associated array, the minimum opening of each iris being commensurate with the center area of the elements associated with it.

16. The system of claim 15 including means responsive to the relative magnitudes of said signals for adjusting the openings of said irises, said openings being minimum when equal energy levels derive from said arrays.

17. The system of claim 15 including means for varying the angle of light incident upon said first ends from said means for focusing.

18. The system of claim 17 including means responsive to the relative magnitudes of said signals for adjusting said angle, said angle being minimum when equal energy levels derive from said arrays.

19. A system for tracking an optical image comprising means for transmitting the optical image to a pair of remote locations, means for focusing the image on the input of said transmitting means, said transmitting means including a multiplicity of rod like elements transmitting light from their first ends to their other ends, said first ends being positioned adjacent to each other in the focal plane of said image, said first ends being divided into two separate adjacent segments having a common boundary, the second ends of the elements of said segments being arranged in separate, first and second arrays, respectively, the elements in each array together forming an image common thereto, the first ends in the first of said segments at the boundary being positioned at a predetermined position of said first array, the first ends of the second segment at the boundary being positioned at a predetermined position of said second array, and means for translating the light energy deriving from each of said arrays into separate signals, the magnitude of each signal being related to the light intensity deriving from the array associated with it, means responsive to the relative amplitudes of said signals for adjusting the position of said first ends so they are tended to be adjusted whereby equal energy levels derive from said arrays, means for varying the angle of light incident upon the first ends from said means for focusing, and means responsive to the relative magnitudes of said signals for adjusting said angle, said angle being minimum when equal energy levels derive from said arrays.

References Cited by the Examiner

UNITED STATES PATENTS

| | | | |
|---|---|---|---|
| 1,938,003 | 12/1933 | Arthuys et al. | 250—203 X |
| 1,942,604 | 1/1934 | Kennedy | 250—203 X |
| 2,075,094 | 3/1937 | Chubb | 250—227 X |
| 2,122,750 | 7/1938 | Nicolson | 250—227 X |
| 2,510,106 | 6/1950 | Henroteau | 88—1 |
| 2,589,569 | 3/1952 | Peter et al. | 88—1 |
| 2,604,601 | 7/1952 | Menzel | 250—203 X |
| 2,668,869 | 2/1954 | Iams | 88—1 |
| 3,031,351 | 4/1962 | McIlvaine | 88—1 |
| 3,106,642 | 10/1963 | Shapiro | 250—203 |

OTHER REFERENCES

Hamrick: "Optical Displacement Measuring Device," IBM Technical Disclosure Bulletin, December 1961, page 85.

RALPH G. NILSON, *Primary Examiner.*

ARCHIE R. BORCHELT, *Examiner.*